US009765225B2

(12) United States Patent
Ishikawa et al.

(10) Patent No.: US 9,765,225 B2
(45) Date of Patent: Sep. 19, 2017

(54) CONDUCTIVE PASTE AND CERAMIC ELECTRONIC COMPONENT

(71) Applicant: Murata Manufacturing Co., Ltd., Nagaokakyo-shi, Kyoto-fu (JP)

(72) Inventors: Masahito Ishikawa, Nagaokakyo (JP); Naoaki Ogata, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 15 days.

(21) Appl. No.: 15/067,736

(22) Filed: Mar. 11, 2016

(65) Prior Publication Data

US 2016/0194504 A1 Jul. 7, 2016

Related U.S. Application Data

(63) Continuation of application No. PCT/JP2014/066770, filed on Jun. 25, 2014.

(30) Foreign Application Priority Data

Sep. 17, 2013 (JP) ................................. 2013-192295

(51) Int. Cl.
H01B 1/22 (2006.01)
B05D 5/12 (2006.01)
(Continued)

(52) U.S. Cl.
CPC ............... *C09D 5/24* (2013.01); *B05D 5/12* (2013.01); *C08L 1/14* (2013.01); *H01B 1/22* (2013.01);
(Continued)

(58) Field of Classification Search
CPC ... H01B 1/00; H01B 1/22; C09D 5/24; B05D 5/12; H01G 4/30
See application file for complete search history.

(56) References Cited

U.S. PATENT DOCUMENTS 4,615,965 A * 10/1986 Matsumoto .......... G03G 5/0525
430/134
2008/0073613 A1* 3/2008 Sugiura .................. B05D 3/207
252/62.54

(Continued)

FOREIGN PATENT DOCUMENTS

CN 101295582 A 10/2008
CN 102859760 A 1/2013
(Continued)

OTHER PUBLICATIONS

International Search Report for PCT/JP2014/066770 mailing date of Sep. 30, 2014.
(Continued)

*Primary Examiner* — Mark Kopec
(74) *Attorney, Agent, or Firm* — Arent Fox LLP

(57) ABSTRACT

A conductive paste obtained by adding an organic solvent B to a vehicle containing a Ni powder, a binder resin component, and an organic solvent A. The Ni powder has an average primary particle size of 30 to 400 nm. The binder resin component is cellulose acetate butyrate. Organic solvent A is a solvent having a $\Delta \delta$ value of 11.5 or less with the cellulose acetate butyrate. Organic solvent B is a solvent having a $\Delta \delta$ value from 11.5 to 25.0 with the cellulose acetate butyrate. A ratio of the organic solvent B relative to a total of the organic solvent A and the organic solvent B is 5.0 to 40.0 wt %.

20 Claims, 1 Drawing Sheet

(51) Int. Cl.
 *C09D 5/24* (2006.01)
 *C08L 1/14* (2006.01)
 *H01G 4/30* (2006.01)
 *H01G 4/008* (2006.01)
 *H01G 4/12* (2006.01)
(52) U.S. Cl.
 CPC ............ *H01G 4/0085* (2013.01); *H01G 4/12* (2013.01); *H01G 4/30* (2013.01)

(56) References Cited

U.S. PATENT DOCUMENTS

| | | |
|---|---|---|
| 2013/0040199 A1 | 2/2013 | Yamamura |
| 2013/0149507 A1* | 6/2013 | Mostowy-Gallagher ............ C09D 11/033 428/195.1 |

FOREIGN PATENT DOCUMENTS

| | | |
|---|---|---|
| JP | 2002-25942 A | 1/2002 |
| JP | 2002-260442 A | 9/2002 |
| JP | 2005-23415 * | 1/2005 |
| JP | 2013-93131 A | 5/2013 |
| WO | WO 2012/011491 A | 1/2012 |

OTHER PUBLICATIONS

Written Opinion for PCT/JP2014/066770 mailing date of Sep. 30, 2014.

* cited by examiner

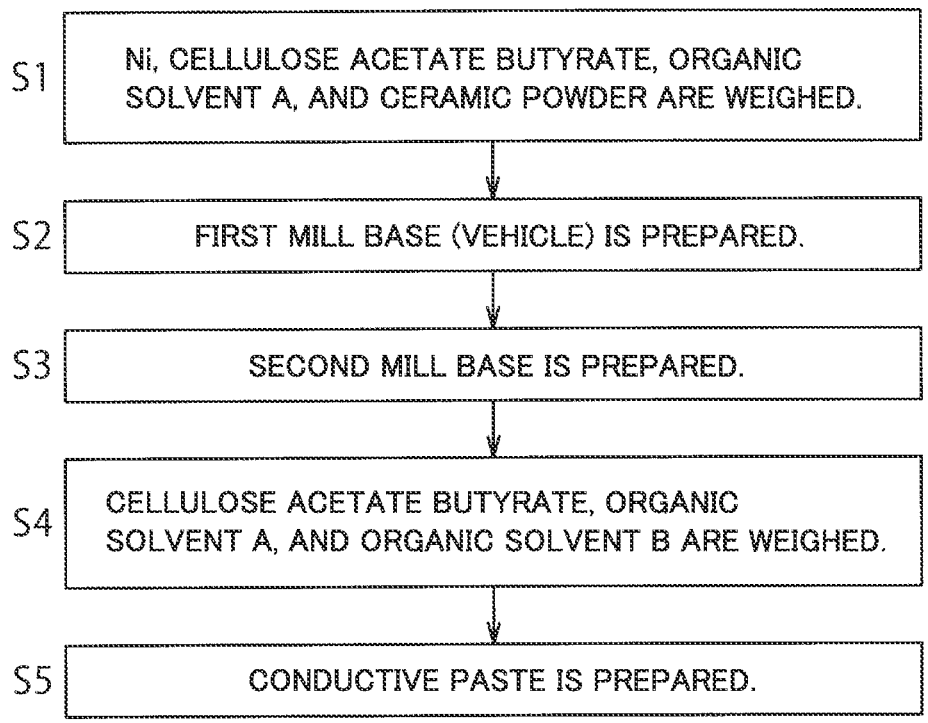
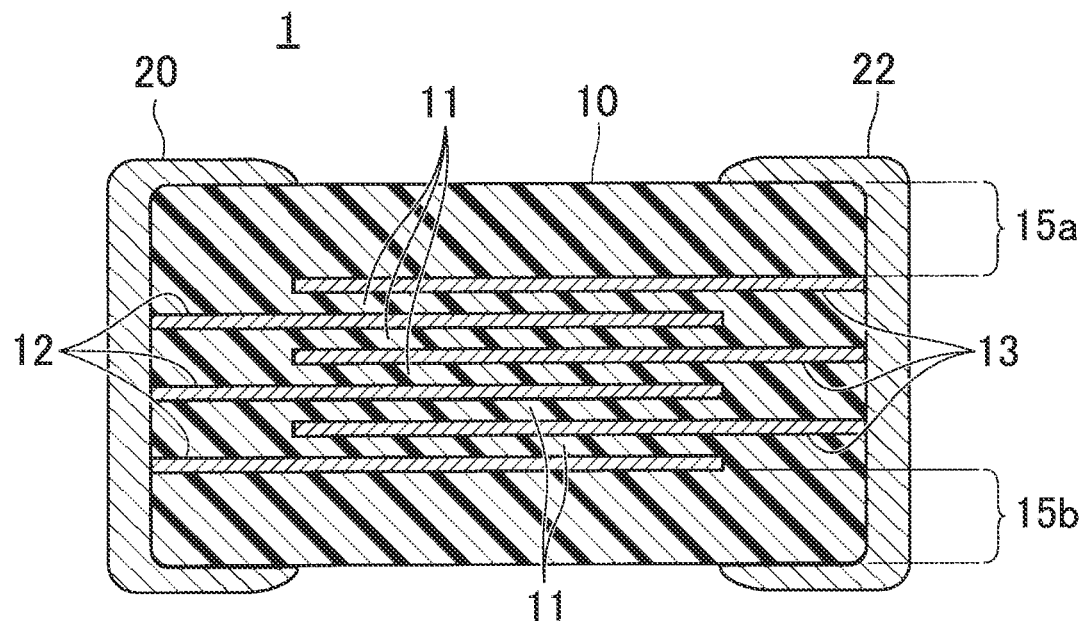

CONDUCTIVE PASTE AND CERAMIC ELECTRONIC COMPONENT

CROSS REFERENCE TO RELATED APPLICATIONS

The present application is a continuation of International application No. PCT/JP2014/066770, filed Jun. 25, 2014, which claims priority to Japanese Patent Application No. 2013-192295, filed Sep. 17, 2013, the entire contents of each of which are incorporated herein by reference.

FIELD OF THE INVENTION

The present invention relates to a conductive paste and a ceramic electronic component.

BACKGROUND OF THE INVENTION

PTD 1 describes a semiconductor electrode containing at least an Ag powder, an In powder, and a cellulose acetate butyrate resin (binder resin), wherein the Ag powder/In powder in terms of weight ratio is preferably 1 to 4.

PTD 1 also describes a method for manufacturing a semiconductor electrode including the steps of applying a conductive paste containing the above-described components onto a semiconductor, and drying the applied conductive paste by heating to a temperature higher than a melting point of In.

The semiconductor electrode described in PTD 1 is excellent in electrical conductivity with a semiconductor, sufficient in flexibility, and exhibits long life and high reliability.
PTD 1: Japanese Patent Laying-Open No. 2002-25942

SUMMARY OF THE INVENTION

However, when the conductive paste containing at least the cellulose acetate butyrate resin and an Ni powder is used to form the semiconductor electrode described in PTD 1, a defect may occur upon printing of the conductive paste, in that a printed coating film is not fully formed due to print blurring, for example.

Specifically, the conductive paste as described in PTD 1 containing the cellulose acetate butyrate resin as a main component of the binder may not be transferred to a semiconductor sheet to which the conductive paste should be transferred, leading to a printing defect. This printing defect is caused by a decrease in the fluidity (increase in the viscosity) of the conductive paste. It is assumed that this decrease in the fluidity of the conductive paste is due to an insufficient amount of adsorption of the cellulose acetate butyrate resin onto the surface of the Ni powder.

Accordingly, an object of the present invention is to provide a conductive paste and a ceramic electronic component in which appropriate fluidity of the paste is maintained so as to provide excellent print characteristics.

The present invention provides a conductive paste obtained by adding an organic solvent B to a vehicle containing a Ni powder, a binder resin component, and an organic solvent A, wherein (a) the Ni powder has an average primary particle size of 30 to 400 nm; (b) the binder resin component is cellulose acetate butyrate; (c) organic solvent A is a solvent having a $\Delta \delta$ value of 11.5 or less with the cellulose acetate butyrate; (d) organic solvent B is a solvent having a $\Delta \delta$ value from 11.5 to 25.0 with the cellulose acetate butyrate; and (e) a ratio of the organic solvent B relative to a total of the organic solvent A and the organic solvent B is 5.0 to 40.0 wt %.

As used herein, the average primary particle refers to particles with the smallest average particle size forming the metal powder. As used herein, the $\Delta \delta$ value represents a measure of the solubility of two components, and means a difference between the solubility parameter values (also referred to as $\delta$ values or SP values) of two solution components. The solubility of the two solution components increases (more readily dissolve) as the $\Delta \delta$ value decreases, and the solubility decreases (more difficult to dissolve) as the $\Delta \delta$ value increases.

In the present invention, the Ni powder is composed of fine particles (filler) with an average primary particle size of 30 to 400 nm, so that a high structural viscosity formed by the binder resin component and the Ni powder is demonstrated. Specifically, as a result of the destruction of entanglement of the polymer of the binder resin component or the structure of interaction between the Ni metal particles, fluidity is created, leading to a decrease in viscosity.

Furthermore, organic solvent A, which is a solvent having a $\Delta \delta$ value of 11.5 or less with cellulose acetate butyrate as the binder resin component, serves as a good solvent for cellulose acetate butyrate to prepare a vehicle. Organic solvent B is then added. Organic solvent B, which is a solvent having a $\Delta \delta$ value from 11.5 to 25.0 with cellulose acetate butyrate as the binder resin component, serves as a poor solvent for cellulose acetate butyrate, which ensures fluidity of the paste.

As used herein, the good solvent refers to a solvent in which a certain substance has high solubility. As used herein, the poor solvent refers to a solvent in which a certain substance has low solubility.

Furthermore, if the ratio of organic solvent B relative to the total organic solvent of organic solvent A and organic solvent B is less than 5.0 wt %, a good printed coating film cannot be readily obtained. On the other hand, if the ratio of organic solvent B relative to the total organic solvent of organic solvent A and organic solvent B exceeds 40.0 wt %, the Ni metal particles in the conductive paste will sediment.

Furthermore, in the conductive paste according to the present invention, organic solvent A is at least one organic solvent selected from the group consisting of alcohols, ethers, esters, and ketones.

More specifically, organic solvent A is at least one selected from the group consisting of acetophenone, anisole, 2-ethylbutyl acetate, 2-ethylhexyl acetate, 2-hexyl acetate, n-propyl acetate, n-hexyl acetate, ethyl acetate, butyl acetate, diisobutyl ketone, dihydroterpineol, dihydroterpineol acetate, terpineol, terpineol acetate, triacetin, phenetole, butyl acetate, butyl butyrate, isopentyl propionate, hexyl acetate, heptyl acetate, benzyl acetate, benzyl alcohol, methyl n-amyl ketone, methyl isobutyl ketone, and methyl ethyl ketone.

Furthermore, in the conductive paste, organic solvent B is an organic solvent selected from the group consisting of hydrocarbons.

More specifically, organic solvent B is at least one selected from the group consisting of α-pinene, hexane, octane, dodecane, toluene, xylene, cyclohexane, methylcyclohexane, and D-limonene.

In the present invention, the conductive paste can be readily formed into a paste by selecting organic solvent A or organic solvent B from the group consisting of the organic solvents described above.

Furthermore, in the present invention, the conductive paste further contains a ceramic solid component, wherein the ceramic solid component has an $ABO_3$ perovskite structure, where A is at least one selected from the group consisting of Ba, Ca, and Sr, and B is at least one selected from Ti and Zr.

In the present invention, the ceramic solid component serves as a sintering inhibiting material for the Ni powder.

Furthermore, in the conductive paste according to the present invention, cellulose acetate butyrate as the binder resin component is a polymer with a weight average molecular weight from 5000 to 650000.

In the present invention, if the weight average molecular weight of cellulose acetate butyrate as the binder resin component is less than 5000, the Ni powder will aggregate, which causes deterioration of the smoothness of a coating film of the conductive paste. On the other hand, if the weight average molecular weight of cellulose acetate butyrate as the binder resin component exceeds 650000, the viscosity of the conductive paste will increase, which causes a printing defect.

The present invention also provides a ceramic electronic component including a conductor pattern formed using the conductive paste described above.

According to the present invention, a ceramic electronic component in which a printing defect is unlikely to occur can be provided, because the conductor pattern is formed on the ceramic using the conductor paste in which appropriate fluidity of the paste is maintained, and which provides an excellent print characteristic.

According to the present invention, a conductive paste can be obtained in which appropriate fluidity of the paste is maintained, and which provides excellent print characteristics.

The foregoing object, as well as other objects, features, and advantages of this invention will become more apparent from the following description of embodiments for carrying out the invention made with reference to the drawings.

BRIEF DESCRIPTION OF THE DRAWINGS

FIG. 1 is a flowchart for use in explaining a conductive paste according to the present invention.

FIG. 2 is a cross-sectional view showing one embodiment of a ceramic electronic component according to the present invention.

DETAILED DESCRIPTION OF THE PREFERRED EMBODIMENTS

Embodiments of a conductive paste according to the present invention and a ceramic electronic component on which a conductor pattern is formed using the conductive paste will be described together with manufacturing methods thereof.

The ceramic electronic component is, for example, a passive device such as a multilayer ceramic capacitor, a multilayer ceramic inductor, a multilayer ceramic thermistor, etc., or a multilayer ceramic substrate on which a wiring conductor is formed to electrically connect between devices. In this embodiment, a multilayer ceramic capacitor will be described as an example of the ceramic electronic component.

1. Conductive Paste

The conductive paste contains a Ni powder, a binder resin component, organic solvent A, organic solvent B, and a ceramic solid component.

The Ni powder is composed of fine particles with an average primary particle size of 30 to 400 nm, so that a high structural viscosity formed by the binder resin component and the Ni powder is demonstrated.

The binder resin component is cellulose acetate butyrate. Cellulose acetate butyrate is a polymer with a weight average molecular weight from 5000 to 650000. If the weight average molecular weight of cellulose acetate butyrate is less than 5000, the Ni powder will aggregate, which causes deterioration of the smoothness of a coating film of the conductive paste. On the other hand, if the weight average molecular weight of cellulose acetate butyrate exceeds 650000, the viscosity of the conductive paste will increase, which causes a printing defect.

Organic solvent A is a solvent having a $\Delta \delta$ value of 11.5 or less with cellulose acetate butyrate as the binder resin component. Organic solvent A is at least one selected from the group consisting of alcohols, ethers, esters, and ketones.

More specifically, organic solvent A is at least one selected from the group consisting of acetophenone, anisole, 2-ethylbutyl acetate, 2-ethylhexyl acetate, 2-hexyl acetate, n-propyl acetate, n-hexyl acetate, ethyl acetate, butyl acetate, diisobutyl ketone, dihydroterpineol, dihydroterpineol acetate, terpineol, terpineol acetate, triacetin, phenetole, butyl acetate, butyl butyrate, isobentyl propionate, hexyl acetate, heptyl acetate, benzyl acetate, benzyl alcohol, methyl n-amyl ketone, methyl isobutyl ketone, and methyl ethyl ketone.

Organic solvent B is a solvent having a $\Delta \delta$ value from 11.5 to 25.0 with cellulose acetate butyrate as the binder resin component. Organic solvent B is selected from the group consisting of hydrocarbons.

More specifically, organic solvent B is at least one selected from the group consisting of α-pinene, hexane, octane, dodecane, toluene, xylene, cyclohexane, methylcyclohexane, and D-limonene.

A ratio of organic solvent B relative to a total organic solvent of organic solvent A and organic solvent B is 5.0 to 40.0 wt %. If the rate of organic solvent B relative to the total organic solvent of organic solvent A and organic solvent B is less than 5.0 wt %, the effect of preventing a decrease in the fluidity of paste will be lessened. On the other hand, if the ratio of organic solvent B relative to the total organic solvent of organic solvent A and organic solvent B exceeds 40.0 wt %, the Ni metal particles in the conductive paste will sediment.

In the present invention, the conductive paste can be readily formed into a paste by selecting organic solvent A or organic solvent B from the group consisting of the organic solvents described above.

Furthermore, the ceramic solid component has an $ABO_3$ perovskite structure, where A is at least one selected from the group consisting of Ba, Ca, and Sr, and B is at least one selected from Ti and Zr. The ceramic solid component serves as a sintering inhibiting material for Ni.

2. Method for Manufacturing Conductive Paste

A method for manufacturing the conductive paste will be described next with reference to the flowchart shown in FIG. 1.

In step S1 shown in FIG. 1, predetermined amounts of the Ni powder, cellulose acetate butyrate as the binder resin component, organic solvent A, and the ceramic powder (ceramic solid component) as the sintering inhibiting component are weighed.

Next, in step S2, each of these materials is stirred to prepare a first mill base. Organic solvent A, which is a solvent having a $\Delta \delta$ value of 11.5 or less with cellulose acetate butyrate as the binder resin component, serves as a good solvent for cellulose acetate butyrate. Thus, a vehicle in which cellulose acetate butyrate is suspended in organic solvent A is prepared. A given amount of a dispersant may be added and kneaded, if required.

Next, in step S3, the first mill base is kneaded using a dispersion method such as a three roll mill or the like, to cause uniform dispersion of the Ni powder, thus preparing a second mill base.

Then, in step S4, for the second mill base, predetermined amounts of cellulose acetate butyrate, organic solvent A, and organic solvent B are weighed.

Next, in step S5, each of these materials is mixed into the second mill base and stirred to prepare a conductive paste while adjusting the viscosity. At this time, a given amount of an additive may also be added.

Organic solvent B, which is a solvent having a $\Delta \delta$ value from 11.5 to 25.0 with cellulose acetate butyrate as the binder resin component, serves as a poor solvent for cellulose acetate butyrate. Thus, upon mixing of organic solvent B, cellulose acetate butyrate is transferred away from organic solvent B toward the surface of the Ni metal particles. That is, the Ni metal particles adsorb thereon an increased amount of cellulose acetate butyrate. Fluidity is created by molecules of this adsorbed cellulose acetate butyrate, via an interaction such as crosslinking or the like. Thus, fluidity of the paste can be ensured even when cellulose acetate butyrate is used.

Note that because the Ni powder is composed of fine particles (filler) with an average primary particle size of 30 to 400 nm, the surface area of the Ni metal particles on which the binder resin component is adsorbed is increased, so that a significant decrease in viscosity is demonstrated.

3. Ceramic Electronic Component

FIG. 2 is a vertical cross-sectional view showing a multilayer ceramic capacitor 1 in a longitudinal direction, in which internal electrodes are formed using the above-described conductive paste. Note that the present invention is also applicable to an LC filter, an LC module, or the like.

Multilayer ceramic capacitor 1 includes a ceramic main body 10, and external electrodes 20, 22 formed on left and right ends of ceramic main body 10.

Ceramic main body 10 has a rectangular parallelepiped-shaped stacked structure including a plurality of inner ceramic layers 11, a plurality of internal electrodes 12, 13 each arranged at an interface between the plurality of inner ceramic layers 11, and outer ceramic layers 15a, 15b arranged in upper and lower portions to sandwich the plurality of inner ceramic layers 11.

Internal electrode 12 and internal electrode 13 are opposed to each other in a thickness direction, with inner ceramic layer 11 made of a dielectric material sandwiched therebetween. A capacitance is formed in this portion where internal electrode 12 and internal electrode 13 are opposite to each other with inner ceramic layer 11 sandwiched therebetween. Internal electrodes 12, 13 are prepared using the above-described conductive paste.

Left end portions of internal electrodes 12 extend to a left end surface of ceramic main body 10 to be electrically connected with external electrode 20. Right end portions of internal electrodes 13 extend to a right end surface of ceramic main body 10 to be electrically connected with external electrode 22.

In multilayer ceramic capacitor 1 having the above-described structure, internal electrodes 12, 13 are prepared using the above-described conductive paste in which the fluidity of the paste is unlikely to decrease, and which provides an excellent print characteristic. This results in multilayer ceramic capacitor 1 in which a printing defect is unlikely to occur.

4. Method for Manufacturing Ceramic Electronic Component

A method for manufacturing multilayer ceramic capacitor 1 described above will be described next.

An organic solvent such as toluene, Eliken, or the like is added to a dielectric powder and mixed. A binder and a plasticizer are then further added and mixed, thus preparing a slurry. This slurry is molded into an inner or outer ceramic green sheets using a doctor blade method.

Next, the above-described conductive paste is printed onto the inner ceramic green sheets, using a method such as screen printing, ink jet printing, gravure printing, or the like, to form a conductive paste film (raw conductor pattern) for forming internal electrode 12 or 13.

Next, a plurality of the inner ceramic green sheets each having the conductive paste film formed thereon are stacked such that respective end portions of the conductive paste films extend in alternating directions. A plurality of outer ceramic green sheet layers are further stacked in upper and lower portions to sandwich the stacked inner ceramic green sheets, and then compression bonded. In this way, ceramic main body 10 is formed as an unfired stacked structure for forming the main body of multilayer ceramic capacitor 1.

Next, unfired ceramic main body 10 is cut into a predetermined product size.

Cut unfired ceramic main body 10 is fired to form fired ceramic main body 10.

The inner and outer ceramic green sheets and the conductive paste films are fired simultaneously, resulting in the inner ceramic green sheets forming inner ceramic layers 11, the outer ceramic green sheets forming outer ceramic layers 15a, 15b, and the conductive paste films forming internal electrodes 12, 13.

Next, a Cu paste is applied to each of opposite end portions of fired ceramic main body 10, and then baked, thus forming external electrodes 20, 22 electrically connected to internal electrodes 12, 13. A surface layer of each of external electrodes 20, 22 is then Ni—Sn plated using wet plating. In this way, multilayer ceramic capacitor 1 is obtained.

EXAMPLES

Samples according to examples and comparative examples were prepared, and characteristics of the conductive paste (a print characteristic, a dispersion stability characteristic, and a coating film smoothness characteristic) were evaluated.

1. Methods of Evaluating Characteristics in Examples and Comparative Examples (Print Characteristic)

A conductive paste prepared by the manufacturing method shown in FIG. 1 was printed using screen printing onto an inner ceramic green sheet (thickness: 10 μm) of multilayer ceramic capacitor 1. The resulting material was then dried in a drying oven at a predetermined temperature for a predetermined time, thus preparing an inner ceramic green sheet in which a conductive paste film (raw conductor pattern) for forming internal electrode 12 or 13 was formed on a surface thereof.

Next, a printed coating film surface (sheet surface of the side on which the conductive paste film was formed) of the inner ceramic green sheet was examined with an optical microscope, and the presence or absence of a printing defect (a faded portion on which the conductive paste film was not formed) was evaluated. A case "Without" a printing defect was determined to be "O", and a case "With" a printing defect was determined to be "X".

(Dispersion Stability Characteristic)

The conductive paste prepared by the manufacturing method shown in FIG. 1 was placed in a storage container, and left standing at room temperature for 30 days.

Then, using a specific gravity bottle method, a specific gravity of an upper layer portion and a specific gravity of a lower layer portion of the conductive paste placed in the container were measured. A case where a difference in specific gravity of the conductive paste was 0.10 or more was determined to be "X" as being "With" sedimentation. A case where a difference in specific gravity of the conductive paste was less than 0.10 was determined to be "O" as being "Without" sedimentation.

(Coating Film Smoothness Characteristic)

The conductive paste prepared by the manufacturing method shown in FIG. 1 was printed using screen printing onto a glass substrate to a film thickness of 10 μm. The resulting material was then dried in a drying oven at a predetermined temperature for a predetermined time, thus preparing a glass substrate on which a conductive paste film was formed on a surface thereof.

Next, an image of a surface of the conductive paste film on the glass substrate was taken with an electron microscope, and the number of masses each having a size of 1.0 μm or more, present within an examined area of 1 mm², were counted. A case where the number of masses exceeded 300 was determined to be "X", and a case where the number of masses was 300 or less was determined to be "O".

(Comprehensive Determination)

Of the above-described items of evaluation (the print characteristic, the dispersion stability characteristic, and the coating film smoothness characteristic), if at least one item of evaluation was determined to be "X", the comprehensive determination was determined to be "X".

2. Example 1 and Comparative Example 1

(Preparation of Samples According to Example 1 and Comparative Example 1)

Conductive pastes as samples 1 to 10 according to Example 1 were prepared by the manufacturing method shown in FIG. 1, using the materials shown in Table 1. Conductive pastes as samples 11 to 16 according to Comparative Example 1 outside the scope of the present invention were prepared by the same manufacturing method, using the materials shown in Table 2.

TABLE 1

Example 1

| | Ceramic | Metal | Binder Resin | Organic Solvent | | | Print characteristic | | Dispersion Stability | | Coating Film Smoothness | | Comprehensive |
| | | | | | | | | | | | | | |
| Sample | Component | Component | Primary Particle Size (nm) | Weight Average Molecular Weight | CAB - Organic Solvent A $\Delta\delta$ | CAB - Organic Solvent B $\Delta\delta$ | Ratio of Organic Solvent B (wt %) | Printing Defect | Determination | Sedimentation | Determination | Masses | Determination | Determination |
|---|---|---|---|---|---|---|---|---|---|---|---|---|---|---|
| 1 | BaTiO$_3$ | Ni | 150 | 10,000 | 1.0 | 12.5 | 10.0 | Without | O | Without | O | 218 | O | O |
| 2 | BaTiO$_3$ | Ni | 200 | 73,000 | 5.1 | 12.5 | 15.0 | Without | O | Without | O | 251 | O | O |
| 3 | SrTiO$_3$ | Ni | 200 | 73,000 | 7.0 | 12.5 | 20.0 | Without | O | Without | O | 237 | O | O |
| 4 | SrTiO$_3$ | Ni | 80 | 73,000 | 10.5 | 12.5 | 25.0 | Without | O | Without | O | 261 | O | O |
| 5 | CaZrO$_3$ | Ni | 350 | 27,000 | 11.5 | 12.5 | 10.0 | Without | O | Without | O | 224 | O | O |
| 6 | BaTiO$_3$ | Ni | 250 | 27,000 | 10.5 | 11.5 | 15.0 | Without | O | Without | O | 239 | O | O |
| 7 | BaTiO$_3$ | Ni | 150 | 27,000 | 10.5 | 12.5 | 12.0 | Without | O | Without | O | 201 | O | O |
| 8 | BaTiO$_3$ | Ni | 30 | 15,000 | 10.5 | 16.2 | 25.0 | Without | O | Without | O | 247 | O | O |
| 9 | CaZrO$_3$ | Ni | 250 | 15,000 | 10.5 | 20.6 | 20.0 | Without | O | Without | O | 261 | O | O |
| 10 | BaTiO$_3$ | Ni | 400 | 140,000 | 10.5 | 25.0 | 35.0 | Without | O | Without | O | 224 | O | O |

TABLE 2

Comparative Example 1

| | Ceramic | Metal | Binder Resin | Organic Solvent | | | Print characteristic | | Dispersion Stability | | Coating Film Smoothness | | Comprehensive |
| | | | | | | | | | | | | | |
| Sample | Component | Component | Primary Particle Size (nm) | Weight Average Molecular Weight | CAB - Organic Solvent A $\Delta\delta$ | CAB - Organic Solvent B $\Delta\delta$ | Ratio of Organic Solvent B (wt %) | Printing Defect | Determination | Sedimentation | Determination | Masses | Determination | Determination |
|---|---|---|---|---|---|---|---|---|---|---|---|---|---|---|
| *11 | CaZrO$_3$ | Ni | 150 | 15,000 | 12.0 | 12.5 | 30.0 | Without | O | With | X | 205 | O | X |
| *12 | SrTiO$_3$ | Ni | 250 | 15,000 | 7.0 | 10.5 | 20.0 | With | X | Without | O | 239 | O | X |
| *13 | SrTiO$_3$ | Ni | 350 | 27,000 | 7.0 | 27.8 | 20.0 | Without | O | With | X | 234 | O | X |
| *14 | CaZrO$_3$ | Ni | 150 | 140,000 | 7.0 | 30.3 | 20.0 | Without | O | With | X | 205 | O | X |
| *15 | BaTiO$_3$ | Ni | 20 | 5,000 | 10.5 | 12.5 | 15.0 | With | X | Without | O | 278 | O | X |
| *16 | SrTiO$_3$ | Ni | 450 | 5,000 | 10.5 | 12.5 | 15.0 | With | X | Without | O | 335 | X | X |

*means that the sample is outside the scope of the present invention.

For samples 1 to 10 according to Example 1, conditions were set such that there were five Δ δ values of 1.0, 5.1, 7.0, 10.5, and 11.5 between cellulose acetate butyrate (denoted as "CAB" in Table 1) and organic solvent A. On the other hand, for samples 11 to 16 according to Comparative Example 1, conditions were set such that there were three Δ δ values of 12.0, 7.0, and 10.5 between cellulose acetate butyrate and organic solvent A.

Furthermore, for samples 1 to 10 according to Example 1, conditions were set such that there were five Δ δ values of 12.5, 11.5, 16.2, 20.6, and 25.0 between cellulose acetate butyrate and organic solvent B. On the other hand, for samples 11 to 16 according to Comparative Example 1, conditions were set such that there were four Δ δ values of 12.5, 10.5, 27.8, and 30.3 between cellulose acetate butyrate and organic solvent B.

Furthermore, for samples 1 to 10 according to Example 1, conditions were set such that the average primary particle size of the Ni powder ranged from 30 to 400 nm.

On the other hand, for samples 11 to 16 according to Comparative Example 1, conditions were set such that the average primary particle size of the Ni powder ranged from 20 to 450 nm.

(Results of Characteristics Evaluation of Example 1 and Comparative Example 1)

As is clear from Table 1, good printed coating films were obtained for samples 1 to 10 according to Example 1 (that is, the conductive pastes in which organic solvent A with a Δ δ value of 1.0 to 11.5 was used, organic solvent B with a Δ δ value of 11.5 to 25.0 was used, and the average primary particle size of the Ni powder was from 30 to 400 nm).

In contrast, as is clear from Table 2, for sample 11 according to Comparative Example 1 (that is, the conductive paste in which organic solvent A with a Δ δ value of 12.0 was used), the conductive paste sedimented.

Furthermore, for sample 12 according to Comparative Example 1 (that is, the conductive paste in which organic solvent B with a Δ δ value of 10.5 was used), a printing defect occurred. On the other hand, for samples 13 and 14 according to Comparative Example 1 (that is, the conductive pastes in which organic solvent B with a Δ δ value of 27.8 or 30.3 was used), the paste sedimented.

Furthermore, for sample 15 according to Comparative Example 1 (that is, the conductive paste with an average primary particle size of the Ni powder as small as 20 nm), the conductive paste had a high viscosity, such that a printing defect with fade upon printing occurred. On the other hand, for sample 16 according to Comparative Example 1 (that is, the conductive paste with an average primary particle size of the Ni powder as great as 450 nm), a printing defect occurred in which the conductive paste was not transferred.

3. Example 2 and Comparative Example 2

(Preparation of Samples According to Example 2 and Comparative Example 2)

Conductive pastes as samples 17 to 20 according to Example 2 were prepared by the manufacturing method shown in FIG. 1, using the materials shown in Table 3. Conductive pastes as samples 21 and 22 according to Comparative Example 2 outside the scope of the present invention were prepared by the same manufacturing method, using the materials shown in Table 4.

TABLE 3

Example 2

| Sample | Ceramic Component | Metal Component | Primary Particle Size (nm) | Binder Resin Weight Average Molecular Weight | Organic Solvent | | | Print characteristic | | Dispersion Stability | | Coating Film Smoothness | | Comprehensive |
|---|---|---|---|---|---|---|---|---|---|---|---|---|---|---|
| | | | | | CAB - Organic Solvent A Δδ | CAB - Organic Solvent B Δδ | Ratio of Organic Solvent B (wt %) | Printing Defect | Determination | Sedimentation | Determination | Masses | Determination | Determination |
| 17 | CaZrO$_3$ | Ni | 200 | 27,000 | 7.0 | 16.0 | 5.0 | Without | ○ | Without | ○ | 219 | ○ | ○ |
| 18 | BaTiO$_3$ | Ni | 150 | 27,000 | 6.0 | 18.5 | 15.0 | Without | ○ | Without | ○ | 198 | ○ | ○ |
| 19 | BaTiO$_3$ | Ni | 200 | 73,000 | 9.0 | 22.0 | 25.0 | Without | ○ | Without | ○ | 215 | ○ | ○ |
| 20 | SrTiO$_3$ | Ni | 200 | 15,000 | 7.0 | 12.5 | 40.0 | Without | ○ | Without | ○ | 242 | ○ | ○ |

TABLE 4

Comparative Example 2

| Sample | Ceramic Component | Metal Component | Primary Particle Size (nm) | Binder Resin Weight Average Molecular Weight | Organic Solvent | | | Print characteristic | | Dispersion Stability | | Coating Film Smoothness | | Comprehensive |
|---|---|---|---|---|---|---|---|---|---|---|---|---|---|---|
| | | | | | CAB - Organic Solvent A Δδ | CAB - Organic Solvent B Δδ | Ratio of Organic Solvent B (wt %) | Printing Defect | Determination | Sedimentation | Determination | Masses | Determination | Determination |
| *21 | BaTiO$_3$ | Ni | 150 | 15,000 | 7.0 | 22.0 | 3.0 | With | X | Without | ○ | 253 | ○ | X |
| *22 | SrTiO$_3$ | Ni | 200 | 73,000 | 7.0 | 12.5 | 50.0 | Without | ○ | With | X | 251 | ○ | X |

For samples 17 to 20 according to Example 2, conditions were set such that there were four ratios of organic solvent B of 5.0, 15.0, 25.0, and 40.0 wt %, relative to the total organic solvent of organic solvent A and organic solvent B. On the other hand, for samples 21 and 22 according to Comparative Example 2, conditions were set such that there were two ratios of organic solvent B of 3.0 and 50.0 wt %, relative to the total organic solvent of organic solvent A and organic solvent B.

(Results of Characteristics Evaluation of Example 2 and Comparative Example 2)

As is clear from Table 3, good printed coating films were obtained for samples 17 to 20 according to Example 2 (that is, the conductive pastes in which the ratio of organic solvent B relative to the total organic solvent of organic solvent A and organic solvent B was from 5.0 to 40.0 wt %).

In contrast, as is clear from Table 4, for sample 21 according to Comparative Example 2 (that is, the conductive paste in which the ratio of organic solvent B relative to the total organic solvent of organic solvent A and organic solvent B was as low as 3.0 wt %), a printing defect occurred. On the other hand, for sample 22 according to Comparative Example 2 (that is, the conductive paste in which the ratio of organic solvent B relative to the total organic solvent of organic solvent A and organic solvent B was as high as 50.0 wt %), the Ni powder in the paste sedimented.

4. Example 3

(Preparation of Sample According to Example 3)

Conductive pastes as samples 23 to 48 according to Example 3 were prepared by the manufacturing method shown in FIG. 1, using the materials shown in Table 5. The samples according to Example 3 were prepared by setting conditions for organic solvents A and B such that different solvents were selected for each sample.

TABLE 5

Example 3

| | Metal | | | | Organic Solvent | | |
| --- | --- | --- | --- | --- | --- | --- | --- |
| Sample | Ceramic Component | Component | Primary Particle Size (nm) | Binder Resin Weight Average Molecular Weight | Organic Solvent A Component | Organic Solvent B Component | Ratio of Organic Solvent B (wt %) |
| 23 | BaTiO$_3$ | Ni | 200 | 27,000 | Acetophenone | Hexane | 15.0 |
| 24 | BaTiO$_3$ | Ni | 200 | 73,000 | Anisole | α-Pinene | 15.0 |
| 25 | SrTiO$_3$ | Ni | 150 | 120,000 | 2-Ethylbutyl Acetate | Octane | 20.0 |
| 26 | SrTiO$_3$ | Ni | 200 | 27,000 | 2-Ethylhexyl Acetate | Dodecane | 25.0 |
| 27 | CaZrO$_3$ | Ni | 350 | 32,000 | 2-Hexyl Acetate | Toluene | 10.0 |
| 28 | BaTiO$_3$ | Ni | 200 | 15,000 | n-Propyl Acetate | Xylene | 15.0 |
| 29 | BaTiO$_3$ | Ni | 150 | 15,000 | n-Hexyl Acetate | Dodecane | 12.0 |
| 30 | BaTiO$_3$ | Ni | 50 | 140,000 | Ethyl Acetate | Methylcyclohexane | 30.0 |
| 31 | BaTiO$_3$ | Ni | 400 | 27,000 | Butyl Acetate | D-limonene | 20.0 |
| 32 | BaTiO$_3$ | Ni | 150 | 300,000 | Diisobutyl Ketone | Dodecane | 15.0 |
| 33 | SrTiO$_3$ | Ni | 200 | 27,000 | Dihydroterpineol | α-Pinene | 30.0 |
| 34 | BaTiO$_3$ | Ni | 150 | 32,000 | Dihydroterpineol Acetate | Xylene | 15.0 |
| 35 | BaTiO$_3$ | Ni | 350 | 27,000 | Terpineol | Cyclohexane | 20.0 |
| 36 | SrTiO$_3$ | Ni | 200 | 450,000 | Terpineol Acetate | Hexane | 30.0 |
| 37 | SrTiO$_3$ | Ni | 200 | 27,000 | Triacetin | Octane | 25.0 |
| 38 | CaZrO$_3$ | Ni | 200 | 27,000 | Phenetole | Dodecane | 30.0 |
| 39 | BaTiO$_3$ | Ni | 200 | 27,000 | Butyl Acetate | Toluene | 15.0 |
| 40 | BaTiO$_3$ | Ni | 150 | 300,000 | Butyl Butyrate | Xylene | 25.0 |
| 41 | CaZrO$_3$ | Ni | 200 | 27,000 | Heptyl Acetate | D-Limonene | 20.0 |
| 42 | BaTiO$_3$ | Ni | 200 | 70,000 | Benzyl Acetate | α-Pinene | 22.0 |
| 43 | BaTiO$_3$ | Ni | 200 | 500,000 | Benzyl Alcohol | Hexane | 15.0 |
| 44 | SrTiO$_3$ | Ni | 50 | 27,000 | Methyl n-Amyl Ketone | Octane | 10.0 |
| 45 | CaZrO$_3$ | Ni | 200 | 27,000 | Methyl Isobutyl Ketone | Toluene | 10.0 |
| 46 | BaTiO$_3$ | Ni | 200 | 75,000 | Hexyl Acetate | Toluene | 30.0 |
| 47 | BaTiO$_3$ | Ni | 200 | 27,000 | Isobentyl Propionate | Methylcyclohexane | 15.0 |
| 48 | BaTiO$_3$ | Ni | 250 | 56,000 | Methyl Ethyl Ketone | Hexane | 20.0 |

| | Print characteristic | | Coating Film | | | | |
| --- | --- | --- | --- | --- | --- | --- | --- |
| Sample | Printing Defect | Determination | Dispersion Stability Sedimentation | Determination | Smoothness Masses | Determination | Comprehensive Determination |
| 23 | Without | ○ | Without | ○ | 238 | ○ | ○ |
| 24 | Without | ○ | Without | ○ | 162 | ○ | ○ |
| 25 | Without | ○ | Without | ○ | 139 | ○ | ○ |
| 26 | Without | ○ | Without | ○ | 218 | ○ | ○ |
| 27 | Without | ○ | Without | ○ | 233 | ○ | ○ |
| 28 | Without | ○ | Without | ○ | 240 | ○ | ○ |
| 29 | Without | ○ | Without | ○ | 198 | ○ | ○ |
| 30 | Without | ○ | Without | ○ | 238 | ○ | ○ |
| 31 | Without | ○ | Without | ○ | 227 | ○ | ○ |
| 32 | Without | ○ | Without | ○ | 221 | ○ | ○ |
| 33 | Without | ○ | Without | ○ | 212 | ○ | ○ |
| 34 | Without | ○ | Without | ○ | 193 | ○ | ○ |
| 35 | Without | ○ | Without | ○ | 224 | ○ | ○ |
| 36 | Without | ○ | Without | ○ | 206 | ○ | ○ |

TABLE 5-continued

| | | | | | | | |
|---|---|---|---|---|---|---|---|
| | Example 3 |||||||
| 37 | Without | ○ | Without | ○ | 188 | ○ | ○ |
| 38 | Without | ○ | Without | ○ | 198 | ○ | ○ |
| 39 | Without | ○ | Without | ○ | 204 | ○ | ○ |
| 40 | Without | ○ | Without | ○ | 211 | ○ | ○ |
| 41 | Without | ○ | Without | ○ | 202 | ○ | ○ |
| 42 | Without | ○ | Without | ○ | 175 | ○ | ○ |
| 43 | Without | ○ | Without | ○ | 247 | ○ | ○ |
| 44 | Without | ○ | Without | ○ | 239 | ○ | ○ |
| 45 | Without | ○ | Without | ○ | 230 | ○ | ○ |
| 46 | Without | ○ | Without | ○ | 180 | ○ | ○ |
| 47 | Without | ○ | Without | ○ | 232 | ○ | ○ |
| 48 | Without | ○ | Without | ○ | 171 | ○ | ○ |

(Results of Characteristics Evaluation of Example 3)

As is clear from Table 5, good printed coating films were obtained for all of the conductive pastes in which organic solvents A and B as used in Example 3 were used.

5. Example 4 and Comparative Example 4

(Preparation of Samples According to Example 4 and Comparative Example 4)

Conductive pastes as samples 49 to 53 according to Example 4 were prepared by the manufacturing method shown in FIG. 1, using the materials shown in Table 6.

Conductive pastes as samples 54 and 55 according to Comparative Example 4 were prepared by the same manufacturing method, using the materials shown in Table 7.

TABLE 6

Example 4

| Sample | Ceramic Component | Metal Component | Primary Particle Size (nm) | Binder Resin Weight Average Molecular Weight | Organic Solvent A Component | Organic Solvent B Component | Ratio of Organic Solvent B (wt %) | Print characteristic Printing Defect | Determination |
|---|---|---|---|---|---|---|---|---|---|
| 49 | SrTiO₃ | Ni | 200 | 5,000 | Terpineol | Hexane | 20.0 | Without | ○ |
| 50 | CaZrO₃ | Ni | 200 | 27,000 | Terpineol Acetate | Dodecane | 25.0 | Without | ○ |
| 51 | BaTiO₃ | Ni | 200 | 73,000 | Triacetin | Toluene | 25.0 | Without | ○ |
| 52 | BaTiO₃ | Ni | 200 | 140,000 | Phenetole | Octane | 30.0 | Without | ○ |
| 53 | BaTiO₃ | Ni | 200 | 650,000 | Butyl Acetate | Xylene | 20.0 | Without | ○ |

| Sample | Dispersion Stability Sedimentation | Determination | Coating Film Smoothness Masses | Determination | Comprehensive Determination |
|---|---|---|---|---|---|
| 49 | Without | ○ | 198 | ○ | ○ |
| 50 | Without | ○ | 158 | ○ | ○ |
| 51 | Without | ○ | 167 | ○ | ○ |
| 52 | Without | ○ | 189 | ○ | ○ |
| 53 | Without | ○ | 209 | ○ | ○ |

TABLE 7

Comparative Example 4

| Sample | Ceramic Component | Metal Component | Primary Particle Size (nm) | Binder Resin Weight Average Molecular Weight | Organic Solvent A Component | Organic Solvent B Component | Ratio of Organic Solvent B (wt %) | Print characteristic Printing Defect | Determination |
|---|---|---|---|---|---|---|---|---|---|
| 54 | SrTiO$_3$ | Ni | 200 | 2,500 | Isobentyl Propionate | Hexane | 20.0 | Without | ○ |
| 55 | BaTiO$_3$ | Ni | 200 | 780,000 | Isobentyl Propionate | Dodecane | 25.0 | With | X |

| Sample | Dispersion Stability Sedimentation | Determination | Coating Film Smoothness Masses | Determination | Comprehensive Determination |
|---|---|---|---|---|---|
| 54 | Without | ○ | 312 | X | X |
| 55 | Without | ○ | 202 | ○ | X |

For samples 49 to 53 according to Example 4, conditions were set such that the weight average molecular weight of cellulose acetate butyrate as the binder resin ranged from 5000 to 650000. On the other hand, for samples 54 and 55 according to Comparative Example 4, conditions were set such that there were two weight average molecular weights of 2500 and 780000 of cellulose acetate butyrate.

(Results of Characteristics Evaluation of Example 4 and Comparative Example 4)

As is clear from Table 6, good printed coating films were obtained for samples 49 to 53 according to Example 4 (that is, the conductive pastes in which the weight average molecular weight of the cellulose acetate butyrate resin ranged from 5000 to 65000).

On the other hand, as is clear from Table 7, for sample 54 according to Comparative Example 4 (that is, the conductive paste in which the weight average molecular weight of cellulose acetate butyrate was as low as 2500), the number of masses exceeded 300, which caused deterioration of the smoothness of the coating film. On the other hand, for sample 55 according to Comparative Example 4 (that is, the conductive paste in which the weight average molecular weight of cellulose acetate butyrate was as high as 780000), the viscosity of the paste increased, which caused a printing defect.

It is noted that this invention is not limited to the foregoing embodiments, and various modifications may be made thereto within the gist of the scope of the invention.

REFERENCE SIGNS LIST

1: ceramic electronic component (multilayer ceramic capacitor);
10: ceramic main body;
11: inner ceramic layer;
12, 13: internal electrode;
15a, 15b: outer ceramic layer; and
20, 22: external electrode.

The invention claimed is:

1. A conductive paste comprising:
   (a) Ni powder having an average primary particle size of 30 to 400 nm;
   (b) cellulose acetate butyrate;
   (c) organic solvent A having a Δ δ value of 11.5 or less with the cellulose acetate butyrate; and
   (d) organic solvent B different from organic solvent A having a Δ δ value from 11.5 to 25.0 with the cellulose acetate butyrate,
   a ratio of the organic solvent B relative to a total of the organic solvent A and the organic solvent B is 5.0 to 40.0 wt %.

2. The conductive paste according to claim 1, wherein the organic solvent A is selected from the group consisting of alcohols, ethers, esters, and ketones.

3. The conductive paste according to claim 2, wherein the organic solvent A is at least one solvent selected from the group consisting of acetophenone, anisole, 2-ethylbutyl acetate, 2-ethylhexyl acetate, 2-hexyl acetate, n-propyl acetate, n-hexyl acetate, ethyl acetate, butyl acetate, diisobutyl ketone, dihydroterpineol, dihydroterpineol acetate, terpineol, terpineol acetate, triacetin, phenetole, butyl acetate, butyl butyrate, isopentyl propionate, hexyl acetate, heptyl acetate, benzyl acetate, benzyl alcohol, methyl n-amyl ketone, methyl isobutyl ketone, and methyl ethyl ketone.

4. The conductive paste according to claim 2, wherein the organic solvent B is a hydrocarbon.

5. The conductive paste according to claim 4, wherein the organic solvent B is at least one solvent selected from the group consisting of α-pinene, hexane, octane, dodecane, toluene, xylene, cyclohexane, methylcyclohexane, and D-limonene.

6. The conductive paste according to claim 1, wherein the organic solvent B is a hydrocarbon.

7. The conductive paste according to claim 6, wherein the organic solvent B is at least one solvent selected from the group consisting of α-pinene, hexane, octane, dodecane, toluene, xylene, cyclohexane, methylcyclohexane, and D-limonene.

8. The conductive paste according to claim 1, further comprising a ceramic solid component, and the ceramic solid component has an ABO$_3$ perovskite structure, where A is at least one selected from the group consisting of Ba, Ca, and Sr, and B is at least one selected from Ti and Zr.

9. The conductive paste according to claim 1, wherein the cellulose acetate butyrate is a polymer with a weight average molecular weight from 5000 to 650000.

10. A method of manufacturing a conductive paste, the method comprising:

providing a vehicle containing:
(a) Ni powder having an average primary particle size of 30 to 400 nm;
(b) cellulose acetate butyrate; and
(c) organic solvent A having a $\Delta \delta$ value of 11.5 or less with the cellulose acetate butyrate; and mixing an organic solvent B different from organic solvent A having a $\Delta \delta$ value from 11.5 to 25.0 with the cellulose acetate butyrate with the vehicle such that a ratio of the organic solvent B relative to a total of the organic solvent A and the organic solvent B is 5.0 to 40.0 wt %.

11. The method of manufacturing a conductive paste according to claim 10, wherein the organic solvent A is selected from the group consisting of alcohols, ethers, esters, and ketones.

12. The method of manufacturing a conductive paste according to claim 11, wherein the organic solvent A is at least one solvent selected from the group consisting of acetophenone, anisole, 2-ethylbutyl acetate, 2-ethylhexyl acetate, 2-hexyl acetate, n-propyl acetate, n-hexyl acetate, ethyl acetate, butyl acetate, diisobutyl ketone, dihydroterpineol, dihydroterpineol acetate, terpineol, terpineol acetate, triacetin, phenetole, butyl acetate, butyl butyrate, isopentyl propionate, hexyl acetate, heptyl acetate, benzyl acetate, benzyl alcohol, methyl n-amyl ketone, methyl isobutyl ketone, and methyl ethyl ketone.

13. The method of manufacturing a conductive paste according to claim 11, wherein the organic solvent B is a hydrocarbon.

14. The method of manufacturing a conductive paste according to claim 13, wherein organic solvent B is at least one solvent selected from the group consisting of α-pinene, hexane, octane, dodecane, toluene, xylene, cyclohexane, methylcyclohexane, and D-limonene.

15. The method of manufacturing a conductive paste according to claim 10, wherein organic solvent B is a hydrocarbon.

16. The method of manufacturing a conductive paste according to claim 15, wherein organic solvent B is at least one solvent selected from the group consisting of α-pinene, hexane, octane, dodecane, toluene, xylene, cyclohexane, methylcyclohexane, and D-limonene.

17. The method of manufacturing a conductive paste according to claim 10, wherein the vehicle further includes a ceramic solid component, and the ceramic solid component has an $ABO_3$ perovskite structure, where A is at least one selected from the group consisting of Ba, Ca, and Sr, and B is at least one selected from Ti and Zr.

18. The method of manufacturing a conductive paste according to claim 10, wherein the cellulose acetate butyrate is a polymer with a weight average molecular weight from 5000 to 650000.

19. The method of manufacturing a conductive paste according to claim 10, further comprising forming a conductor pattern on a ceramic green sheet using the conductive paste.

20. The method of manufacturing a conductive paste according to claim 19, further comprising forming a ceramic electronic component from a plurality of the ceramic green sheets having the conductive paste thereon.

* * * * *